United States Patent [19]

Hodosawa et al.

[11] Patent Number: 5,405,558
[45] Date of Patent: Apr. 11, 1995

[54] METHOD OF MANUFACTURING MICROCAPSULES

[75] Inventors: Yoshihito Hodosawa; Hideo Nagano; Hirokazu Saito, all of Shizuoka, Japan

[73] Assignee: Fuji Photo Film Co., Ltd., Kanagawa, Japan

[21] Appl. No.: 64,803

[22] Filed: May 21, 1993

[30] Foreign Application Priority Data

May 25, 1992 [JP] Japan ................... 4-156178

[51] Int. Cl.$^6$ .................. B01J 13/14; B01J 13/16
[52] U.S. Cl. ..................... 264/4.1; 252/314; 264/4.7; 425/5
[58] Field of Search ............... 264/4.1, 4.7; 425/5

[56] References Cited

U.S. PATENT DOCUMENTS

| | | | |
|---|---|---|---|
| 3,464,926 | 9/1969 | Vandegaer et al. | 264/4.7 |
| 3,577,515 | 5/1971 | Vandegaer | 264/4.7 X |
| 4,409,201 | 10/1983 | Heinrich et al. | 264/4.7 X |
| 4,454,083 | 6/1984 | Brown et al. | 264/4.7 |
| 4,521,352 | 6/1985 | Hayworth | 264/4.3 |
| 4,532,183 | 7/1985 | Shackle et al. | 264/4.7 X |
| 4,761,255 | 8/1988 | Dahm et al. | 264/4.7 |

FOREIGN PATENT DOCUMENTS

| | | |
|---|---|---|
| 61-21728 | 1/1986 | Japan . |
| 2139030 | 5/1990 | Japan . |
| 1090971 | 11/1967 | United Kingdom ............ 427/213.36 |

Primary Examiner—Richard D. Lovering
Attorney, Agent, or Firm—Sughrue, Mion, Zinn, Macpeak & Seas; Richard C. Turner; Joseph J. Buczynski

[57] ABSTRACT

A method for manufacturing microcapsules which prevents capsule particles from adhering to the inner wall surfaces of a wall-film-forming reactor device, thereby to eliminate the possibility that qualities of the microcapsule, such as the heat resisting, solvent resisting and other properties thereof, are deteriorated, and to eliminate the need for an operation to clean substances adhered to the inner wall surfaces of the wall-film-forming reactor device, and therefore, which is able to manufacture microcapsules at a high production efficiency. An emulsified solution is injected into a wall-film-forming reactor device from the lower portion thereof by an emulsified solution feed pump. After completion of a given time of a wall-film-forming reaction in the wall-film-forming reactor device, the emulsified solution is discharged from an overflow outlet formed in the upper portion of the device, and is then cooled by a heat exchanger. A water vapor injection valve is opened at the same time when, or more preferably, before the emulsified solution is injected into the wall-film-forming reactor device, water vapor is blown into a space in the wall-film-forming reactor device to form water drops on the wall surfaces of the space in the wall-film-forming reactor device to cover the space wall surfaces with the drops.

8 Claims, 1 Drawing Sheet

METHOD OF MANUFACTURING MICROCAPSULES

BACKGROUND OF THE INVENTION

The present invention relates to a method for manufacturing microcapsules having a wall film formed of a synthetic polymer system, and, in particular, to a method with which microcapsules having a polyurethane urea resin wall film can be manufactured with a high efficiency while stabilizing the quality of the microcapsules.

Conventional methods for manufacturing microcapsules, in which an oil solution containing therein a capsule core material and a water solution is emulsified and dispersed, a synthetic polymer system wall film is formed on a solution-drop interface, and the hydrophobic liquid surface of the microcapsule is covered with the synthetic polymer system wall film, include:

(1) A method for manufacturing microcapsules in which the emulsifying reaction is started in an area which is rapidly stirred and mixed thereby to produce an emulsified solution. Next, a reaction thereby produced is moved to a multi-stage cascade in a receptacle, and the temperature of the product is increased stagewise while being maintained constant within each of the stages. (See U.S. Pat. No. 4,761,255.)

(2) A method for manufacturing microcapsules in which an emulsified and dispersed solution is passed through a pipe-shaped reactor successively and allowed to react at a temperature of 40° C.–95° C. (See U.S. Pat. No. 4,454,083.)

(3) A method for manufacturing microcapsules in which a polyisocyanate insoluble in the oil solution is mixed in an inert organic phase, the thus-produced mixture is successively emulsified in a water phase, diamine or polyamine is added to the resultant emulsified solution, and the emulsified solution with diamine or polyamine is added to an interface with the polyisocyanate. (See Unexamined Japanese Patent Publication No. Sho-61-21728.)

(4) A method for manufacturing microcapsules in which, when a hydrophobic oil solution film is covered with a synthetic polymer system wall film, water vapor is directly injected into a dispersion solution for heating processing. (See Unexamined Japanese Patent Publication No. Hei-2-139030.)

However, in method (1) disclosed in U.S. Pat. No. 4,761,255 and in method (3) disclosed in Unexamined Japanese Patent Publication No. Sho-61-21728, the wall-film-forming reaction is effected in a stirring tank having a vapor-liquid interface where capsule particles have a tendency to adhere to the vapor-liquid interface of the stirring tank. If the capsule particles adhere to the interface, then the heat transfer efficiency of the tank is reduced, with the result that the wall-film-forming reaction is insufficient. This results in a reduced quality of the product, and also in mixing of impurities when the tank is switched for production of other types of products. Therefore, it is necessary to clean off such adhered particles periodically, so that the production of microcapsules is thus unavoidably interrupted, which results in reduced production as well as in increased costs of production.

As a countermeasure against these problems, in method (2) disclosed in U.S. Pat. No. 4,454,083, there is proposed a method for passing successively an emulsified solution through a pipe-shaped reactor to effect a wall-film-forming reaction. However, in this method, because the stirring in the pipe-shaped reactor is not sufficient, there is produced a cohered capsule. Otherwise, because the wall-film-forming reaction takes a given holding time, there is required a large-scale apparatus. Also, if the capsule particles adhere to the pipe-shaped reactor, it is difficult to clean the reactor.

Moreover, in method (4) disclosed in Unexamined Japanese Patent Publication No. Hei-2-139030, there is proposed a method for injecting water vapor directly into an emulsified solution for heating processing. However, in this method, since the water vapor is injected into the solution before a capsule wall film is formed completely, the emulsion may be destroyed or split again, which produces a wide distribution of particle diameter, and adhesions may be produced in the vapor-liquid interface.

SUMMARY OF THE INVENTION

The present invention is intended to eliminate the drawbacks found in the above-mentioned conventional methods. Accordingly, it is an object of the invention to provide a method for manufacturing microcapsules which prevents the microcapsules from adhering to the inner wall surfaces of a wall-film-forming reactor device thereby to eliminate the possibility of the microcapsule from being reduced in qualities such as thermal resistance, solvent resisting property, and other properties thereof, which does not require the cleaning of substances adhered to the inner wall surfaces of the wall-film-forming reactor device when a wall-film-forming reaction occurs, and which provides good production efficiency.

In attaining the above object, according to the invention, there is provided a method for manufacturing microcapsules in which an oil solution containing therein a capsule core material is emulsified and dispersed in an aqueous solution and a synthetic-polymer-system wall film is formed in a liquid drop interface, characterized in that, when the emulsified solution is fed into a wall-film-forming reactor device, until the emulsified solution reaches an overflow outlet level set in a space in the wall-film-forming reactor device, water vapor is injected into the space in the wall-film-forming reactor device, and the inner wall surface of the wall-film-forming reactor device is wetted due to condensation of the water vapor.

The present invention is effective especially when the synthetic polymer system wall film is a polyurethane urea resin wall film.

The pressure, temperature and saturation of the water vapor injected into the space in the wall-film-forming reactor device may be set so that the water vapor can be condensed on the inner wall surfaces of the wall-film-forming reactor device. In other words, basically, the temperature of the injected water vapor varies according to the heating medium temperature of the wall-film-forming reactor device. Normally, however, since the heating medium temperatures are in a range of 85° C.–95° C., the temperature of the water vapor may be set to 100° C. (1.0 kg/cm$^2$) or higher, preferably, in the range of 100° C.–130° C. (1.1–3.0 kg/cm$^2$).

DESCRIPTION OF THE PREFERRED EMBODIMENTS

Figure 1:
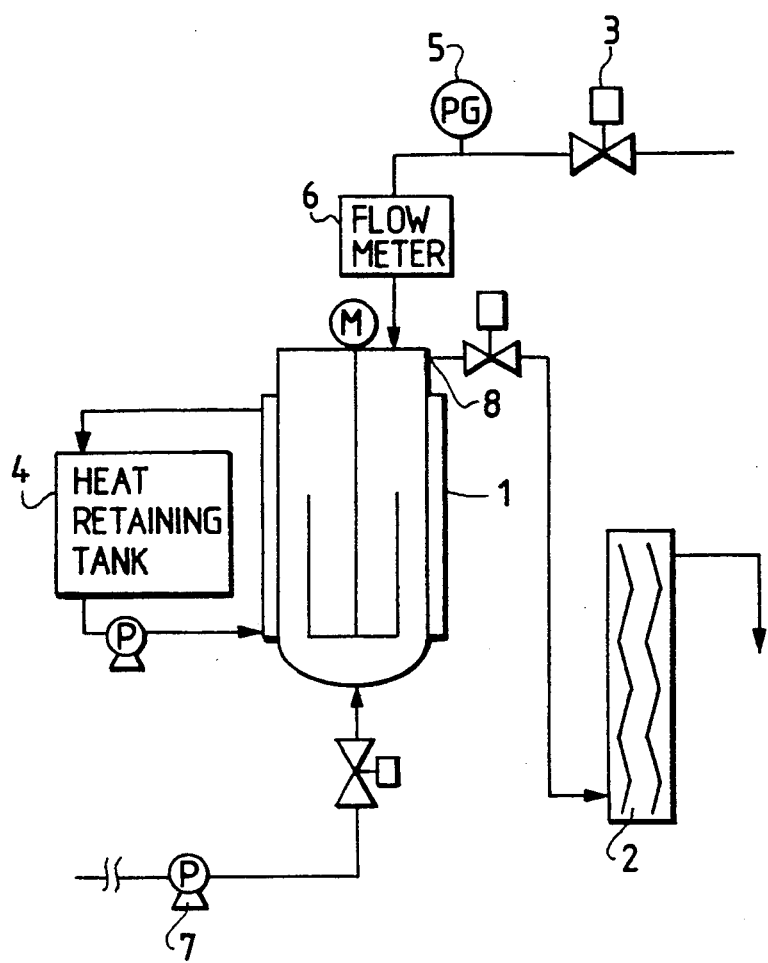
FIG. 1 is a partial flow sheet of an embodiment of a wall-film-forming reactor device according to the invention.

FIG. 1 is a schematic view of an embodiment of a wall-film-forming reactor device constructed according to the invention. In FIG. 1, an emulsified solution is injected into the wall-film-forming reactor device 1 from the lower portion thereof. After a wall-film-forming reaction is completed in a given period of time within the wall-film-forming reactor device 1, the emulsified solution is discharged from an overflow outlet formed in the upper portion of the reactor device 1 and then cooled in a heat exchanger 2. Here, at the same time when or, more preferably, before the emulsified solution is injected into the wall-film-forming reactor device 1, a water vapor injection valve 3 is opened and water vapor is blown through the opened water vapor injection valve 3 into the space in the wall-film-forming reactor device 1 and is turned into droplets on the wall surfaces of the space in the wall-film-forming reactor device 1 to thereby cover the space wall surface. That is, the water vapor is continuously injected into the space in the wall-film-forming reactor device 1 so as to prevent the reaction solution from directly touching the inner walls of the wall-film-forming reactor device 1 in the vapor-liquid interface between the reaction solution and atmosphere. Also, after the emulsified solution is filled up to the overflow outlet level of the wall-film-forming reactor device, the injection of the water vapor is stopped. The overflow outlet level is situated higher than a heat retaining structure such as a jacket or the like and, since the temperatures of the inner walls of the wall-film-forming reactor device 1 are decreased in the vapor-liquid interface between the reaction solution and the space in the device 1, a film of condensed water vapor can be maintained.

Also, the wall-film-forming reactor device is not limited to a special structure but, preferably, such a structure as does not include an atmospheric air opening portion may be employed to minimize the leakage of the water vapor and thus obtain a high efficiency. Further, the material of the wall-film-forming reactor is not specially limited, but can be formed of any of various materials such as aluminum, magnesium, glass or the like, provided that the material has a good heat resisting property.

According to the invention, there is eliminated the possibility that the capsule particles adhere to the inner wall surface of the wall-film-forming reactor device, which eliminates the need for cleaning. Further, because the capsule particles do not adhere to the inner wall surface, a good heat transfer rate between the wall-film-forming reactor device heating medium and the emulsified solution injected into the reactor device is maintained, which allows the reaction to progress as planned and results in the supply of products of stable quality.

Examples of the Invention:

EXAMPLE 1

An aqueous solution at 70° C. was supplied which consisted of 135 parts by weight water and 15 parts by weight polyvinyl alcohol dissolved in the water at flow rates of 1,000 g/min. Next, an oil solution at 70° C. which consisted of 10 parts by weight Crystal Violet Lacton, 1 part by weight benzoyl leuco Methylene Blue, and 4 parts by weight 3- [4-(diethylamino)-2 ethoxyphenyl]-3-(2-methyl-l-ethyl-3 indolyl)-4 azaphthalide respectively dissolved in 200 parts by weight diisopropyl naphthalene at flow rates of 850 g/min, carbodiimide denatured diphenylmethane diisocyanate (manufactured by Nippon Polyurethane Co. under the tradename "Millionate MTL") as polyisocyanate at flow rates of 60 g/min, a biuret member of hexamethylene diisocyanate (manufactured by Sumitomo Bayer Urethane Co. under the tradename "Sumijule N-3200") at flow rates of 60 g/min, and a butylene oxide additive to ethylenediamine as an amine-alkylene oxide adduct (the added number of moles of butylene oxide to ethylenediamine is 16.8; the molecular weight 1267) at flow rates of 30 g/min were supplied to and mixed together in an inline mixer (a pipe line homomixer manufactured by Tokushu Kika Kogyo Co.). Subsequently, the mixture was further mixed with the aqueous solution in a preliminary emulsifying machine-(a Homomic Line Flow machine manufactured by Tokushu Kika Kogyo Co.) to thereby produce a preliminary emulsified solution. The preliminary emulsified solution, which was produced at a temperature of the order of 70° C., was then sent to a continuous emulsifying machine (a colloid mill manufactured by Nippon Seiki Manufacturing Co.) in which the preliminary emulsified solution was continuously prepared to produce an emulsified solution including oil drops having an average particle diameter of 8 μm. Then, the emulsified solution was mixed with diethylene amine as polyamine and capsule-concentration-prepared water at 70° C. in a static mixer at flow rates of 8 g/min and 800 g/min, respectively. Then, the last-mentioned emulsified solution was supplied to the wall-film-forming reactor device 1 by means of an emulsified solution feed pump 7, as shown in FIG. 1. Ten minutes before the above emulsified solution was supplied to the wall-film-forming reactor device 1, the wall-film-forming reactor device 1 was heated by circulating hot water at 95° C. through the jacket by use of a heat retaining tank 4, after which the water vapor injection valve 3 was opened and saturated water vapor at 110° C. (1.5 kg/cm$^2$) was blown through the water vapor injection valve 3 into the space in the wall-film-forming reactor device thereby to wet the inner wall surfaces of the wall-film-forming reactor device. The water vapor was continuously blown into the space in the wall-film-forming reactor device until the wall-film-forming reactor device space was filled with the emulsified solution. The emulsified solution, which was injected into the wall-film-forming reactor device from the lower portion thereof, was then heated to a temperature of 90° C., allowed to stay at this temperature for 60 minutes on average, discharged from an overflow outlet 8 formed in the upper portion of the wall-film-forming reactor device, and finally cooled in the heat exchanger 2, so that a capsule dispersion solution was produced.

In the above example, no capsule particles were adhered to the inner wall surfaces of the wall-film-forming reactor device, and thus capsule dispersion solutions stabilized in quality could be prepared repeatedly.

Comparison Example 1

Similar operations to the above Example 1 of the invention were carried out, except that no water vapor was blown into the wall-film-forming reactor device to obtain a capsule dispersion solution.

In Comparison Example 1, it was found that a large quantity of capsule particles had adhered to the inner walls of the wall-film-forming reactor device. Also, although the temperature of the jacket water was set at 95°, the temperature of the solution in the reactor device was raised only to 75° C., as a result of which it was found that the quality of the resultant capsule dispersion solution was reduced.

To 100 parts by weight each of the capsule dispersion solutions produced for Example 1 and Comparison Example 1 there were added 30 parts by weight of an aqueous solution of 15% polyvinyl alcohol, 10 parts by weight solid carboxyl denatured SBR latex, and 20 parts by weight starch grains (having an average particle diameter of 15 $\mu$m). Next, water was added to each of the above solutions to adjust the solid concentration to 20%, thus to prepare a coating solution. The coating solutions were coated and dried on two respective sheets of stencil paper, each in an amount of 40 g/m$^2$, by use of an air knife coating machine so that the dry weights thereof were respectively 4.0 g/m$^2$, whereby there were obtained two kinds of microcapsule sheets.

Then, the thus-obtained two kinds of microcapsule sheets were combined with developer sheets, and evaluation tests were conducted using the resulting sheets as a pressure-sensitive recording sheet. The evaluation tests were conducted according to the following methods:

Heat Resisting Property Test:

The respective microcapsule sheets were left in the atmosphere at a temperature of 120° C. for 4 hours, subsequently the microcapsule sheets were combined with the developer sheets, and a load of 300 kg/cm$^2$ was applied to the respective combined sheets thereby to cause them to develop colors. Further, a fresh sample, which did not receive the above-mentioned heat treatment, was also similarly caused to develop colors. The concentrations of the visible areas of these color-developed sheets or samples were measured by use of a Macbeth type RD-918 densitometer, and the concentrations of the thermally treated samples were evaluated with respect to the concentration of the fresh sample.

Solvent Resisting Property Test:

The respective microcapsule sheets were immersed for a second or so in ethyl acetate, dried naturally, combined with developer sheets, and a load of 300 kg/cm$^2$ was applied to the respective combined sheets to thereby cause them to develop colors. Further, a fresh sample, which did not receive the solvent treatment, was also similarly caused to develop colors. Afterward, the concentrations of the visible areas of the color-developed sheets or samples were measured using a Macbeth type RD-918 densitometer, and the concentrations of the solvent treated samples were evaluated with respect to the concentration of the fresh sample.

The results of these tests, together with the conditions of capsule particles adhered to the inner walls of the wall-film-forming reactor device, are shown in Table 1.

TABLE 1

|  | Invention | Comparison |
| --- | --- | --- |
| Heat Resisting Property | 95% | 87% |
| Solvent Resisting Property | 96% | 90% |
| Capsule Particle Adhesion Condition | No capsule particle adhered | Much capsule particle adhered |

According to the method of the invention, the possibility of capsule particles adhering to the inner wall surfaces of a wall-film-forming reactor device is essentially eliminated, which prevents lowering of the heat transfer efficiency of the reactor device and provides a uniform wall-film-forming reaction condition. As a result, the invention makes it possible to manufacture a capsule dispersion solution which enjoys a good heat resisting property, a good solvent resisting property, and the like, as well as a solution which is stable in quality.

Also, due to the fact that there is no need for an operation to remove capsule particles adhered to the inner wall surfaces of the wall-film-forming reactor device when the type of capsule dispersion solution to be produced is changed, the worked required for production of microcapsules can be reduced to a great extent, and the Wasted time in production can be significantly reduced, which makes it possible to manufacture microcapsules at an improved production efficiency.

What is claimed is:

1. A method for manufacturing microcapsules in which an oil solution containing therein a capsule core material is emulsified and dispersed in a water solution and a synthetic polymer system wall film for the microcapsules is formed in a liquid drop interface, comprising the steps of:

feeding said emulsified solution into wall-film-forming reactor device having a jacket, so that said emulsified solution being to fill said wall-film-forming reactor device, until said emulsified solution reaches an overflow outlet level in said wall-film-forming reactor device; and while said emulsified solution is being fed into said wall-film-forming reactor device, injecting water vapor into a space between inner wall surfaces of said wall-film-forming reactor device, and said emulsified solution, said water vapor wetting said inner wall surfaces to prevent particles in said emulsified solution from adhering to said inner wall surfaces.

2. The method for manufacturing microcapsules of claim 1, wherein said synthetic polymer system wall film is a polyurethane urea resin wall film.

3. The method for manufacturing microcapsules of claim 1, wherein said water vapor is injected at a temperature in a range of 100° C. to 130° C.

4. The method for manufacturing microcapsules of claim 1, wherein said water vapor is injected at a temperature in a range of 100° C. to 130° C. and at a pressure in a range of 1.1 to 3.0 kg/cm$^2$.

5. The method for manufacturing microcapsules of claim 1, wherein said water vapor is blown into said space.

6. A method as claimed in claim 1, wherein said overflow outlet level is at an upper portion of said wall-film-forming reactor device, and said feeding step feeds said emulsified solution into said wall-film-forming reactor device to substantially fill said wall-film-forming reactor device.

7. A method as claimed in claim 1, wherein said injecting step injects said water vapor into said wall-film-forming reactor device prior to and while said emulsified solution is being fed into said wall-film-forming reactor device.

8. A method as claimed in claim 1, wherein said injecting step stops injecting said water vapor into said wall-film-forming reactor device substantially when said emulsified solution reaches said outlet level in said wall-film-forming reactor device.

* * * * *